United States Patent
Wicks et al.

(10) Patent No.: US 12,246,354 B2
(45) Date of Patent: *Mar. 11, 2025

(54) METHODS, APPARATUSES, AND SYSTEMS FOR AUTOMATICALLY PERFORMING SORTING OPERATIONS

(71) Applicant: INTELLIGRATED HEADQUARTERS, LLC, Mason, OH (US)

(72) Inventors: Matthew Wicks, Charlotte, NC (US); David Pepley, Charlotte, NC (US)

(73) Assignee: Intelligrated Headquarters, LLC, Mason, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 18/404,694

(22) Filed: Jan. 4, 2024

(65) Prior Publication Data
US 2024/0139778 A1    May 2, 2024

Related U.S. Application Data

(63) Continuation of application No. 17/451,572, filed on Oct. 20, 2021.
(Continued)

(51) Int. Cl.
*B07C 5/36* (2006.01)
*B07C 5/08* (2006.01)
(Continued)

(52) U.S. Cl.
CPC .............. *B07C 5/3422* (2013.01); *B07C 5/08* (2013.01); *B07C 5/28* (2013.01); *B07C 5/362* (2013.01); *B65G 65/005* (2013.01)

(58) Field of Classification Search
CPC ........... B07C 5/3422; B07C 5/08; B07C 5/28; B07C 5/362; B07C 5/36; B07C 5/361;
(Continued)

(56) References Cited

U.S. PATENT DOCUMENTS 9,205,558 B1 * 12/2015 Zevenbergen ......... B25J 9/1664
9,487,361 B2 * 11/2016 Girtman ................. B65G 59/02
(Continued)

FOREIGN PATENT DOCUMENTS

CA    2228594 A1    2/1997
CN    105798914 A    7/2016
(Continued)

OTHER PUBLICATIONS

EP Office Action Mailed on Jun. 26, 2024 for EP Application No. 21211978, 4 page(s).
(Continued)

*Primary Examiner* — Gene O Crawford
*Assistant Examiner* — Muhammad Awais
(74) *Attorney, Agent, or Firm* — Alston & Bird LLP

(57) ABSTRACT

Apparatuses, method and computer program products for automatically performing sorting operations are disclosed herein. An example apparatus may comprise: an array of gripping elements, and at least one processing component configured to: obtain image data corresponding with the plurality of items; identify, from the image data, one or more characteristics of the plurality of items; determine, based at least in part on the one or more characteristics, an ordered sequence corresponding with the plurality of items; and generate a control indication to cause at least one of the gripping elements to perform the sorting operations based at least in part on the ordered sequence.

20 Claims, 5 Drawing Sheets

Related U.S. Application Data

(60) Provisional application No. 63/124,482, filed on Dec. 11, 2020.

(51) Int. Cl.
  *B07C 5/28* (2006.01)
  *B07C 5/342* (2006.01)
  *B65G 65/00* (2006.01)

(58) Field of Classification Search
  CPC ..... B07C 5/02; B07C 5/38; B07C 2501/0063; B65G 65/005; G05B 2219/40078; G05B 2219/40532; B25J 9/1612; B25J 9/163; B25J 9/1697; G06F 18/214; G06F 18/2148; G06K 9/6256; G06K 9/6257; G06N 3/08; G06N 20/20; G06T 1/0014; G06T 7/70; G06T 2207/20081; G06T 2207/20084
  USPC .............................. 209/460; 198/377.01, 3, 4
  See application file for complete search history.

(56) References Cited

U.S. PATENT DOCUMENTS

| | | | |
|---|---|---|---|
| 10,814,489 | B1 | 10/2020 | Kalouche et al. |
| 10,857,673 | B2* | 12/2020 | Atohira ................ B65G 47/905 |
| 11,911,801 | B2* | 2/2024 | Wicks .................. B65G 65/005 |
| 2010/0092272 | A1 | 4/2010 | Echelmeyer et al. |
| 2012/0181804 | A1 | 7/2012 | Schmidt et al. |
| 2013/0175206 | A1* | 7/2013 | Li ........................... B07C 5/344 |
| | | | 209/575 |
| 2015/0057793 | A1 | 2/2015 | Kawano |
| 2017/0136632 | A1 | 5/2017 | Wagner et al. |
| 2018/0273296 | A1 | 9/2018 | Wagner et al. |
| 2018/0333749 | A1 | 11/2018 | Wagner et al. |
| 2018/0345324 | A1* | 12/2018 | Hillerich, Jr. ......... B07C 5/3422 |
| 2018/0354121 | A1* | 12/2018 | Sezaki ................. B25J 15/0616 |
| 2019/0061151 | A1 | 2/2019 | Namiki |
| 2019/0070734 | A1* | 3/2019 | Wertenberger ...... B25J 15/0616 |
| 2019/0344448 | A1* | 11/2019 | Wicks ...................... B25J 19/02 |
| 2019/0344974 | A1 | 11/2019 | Wicks et al. |
| 2020/0002107 | A1 | 1/2020 | Morency et al. |
| 2020/0017317 | A1 | 1/2020 | Yap et al. |
| 2020/0055091 | A1 | 2/2020 | Ma et al. |
| 2020/0143127 | A1 | 5/2020 | Wagner et al. |
| 2020/0238519 | A1 | 7/2020 | Diankov et al. |
| 2020/0269283 | A1 | 8/2020 | Ulrich et al. |
| 2020/0306964 | A1 | 10/2020 | Neville et al. |
| 2020/0316787 | A1 | 10/2020 | Fujihara et al. |
| 2020/0353510 | A1 | 11/2020 | Chandler |

FOREIGN PATENT DOCUMENTS

| | | |
|---|---|---|
| CN | 106458479 A | 2/2017 |
| CN | 206811992 U | 12/2017 |
| CN | 108273761 A | 7/2018 |
| CN | 108349083 A | 7/2018 |
| CN | 109436820 A | 3/2019 |
| CN | 109926342 A | 6/2019 |
| CN | 110420888 A | 11/2019 |
| CN | 111977385 A | 11/2020 |
| CN | 111993448 A | 11/2020 |
| EP | 3617936 A1 | 3/2020 |
| WO | 2020/146472 A9 | 8/2020 |

OTHER PUBLICATIONS

Advisory Action (PTOL-303) Mailed on Jul. 13, 2023 for U.S. Appl. No. 17/451,572, 12 page(s).
CN Office Action Mailed on Oct. 12, 2023 for CN Application No. 202111515551, 6 page(s).
CN Office Action, including Search Report Mailed on Mar. 29, 2023 for CN Application No. 202111515551, 10 page(s).
English Translation of CN Office Action dated Oct. 12, 2023 for CN Application No. 202111515551, 14 page(s).
English Translation of CN Office Action, including Search Report dated Mar. 29, 2023 for CN Application No. 202111515551, 14 page(s).
European search report Mailed on Jul. 21, 2022 for EP Application No. 21211978, 10 page(s).
Examiner Interview Summary Record (PTOL-413) Mailed on Jul. 11, 2023 for U.S. Appl. No. 17/451,572, 2 page(s).
Examiner Interview Summary Record (PTOL-413) Mailed on Sep. 6, 2023 for U.S. Appl. No. 177/451,572, 2 page(s).
Final Rejection Mailed on Apr. 25, 2023 for U.S. Appl. No. 17/451,572, 12 page(s).
Non-Final Rejection Mailed on Aug. 8, 2023 for U.S. Appl. No. 17/451,572, 21 page(s).
Non-Final Rejection Mailed on Jan. 5, 2023 for U.S. Appl. No. 17/451,572.
Notice of Allowance and Fees Due (PTOL-85) Mailed on Jan. 22, 2024 for U.S. Appl. No. 17/451,572, 2 page(s).
Notice of Allowance and Fees Due (PTOL-85) Mailed on Oct. 4, 2023 for U.S. Appl. No. 17/451,572, 7 page(s).
CN Office Action Mailed on Mar. 1, 2024 for CN Application No. 202111515551, 5 page(s).
English Translation of CN Office Action dated Mar. 1, 2024 for CN Application No. 202111515551, 12 page(s).
U.S. Appl. No. 17/451,572, filed Oct. 20, 2021, 2022/0184666, Allowed.

* cited by examiner

METHODS, APPARATUSES, AND SYSTEMS FOR AUTOMATICALLY PERFORMING SORTING OPERATIONS

CROSS-REFERENCE TO RELATED APPLICATION

The present application is a continuation of U.S. patent application Ser. No. 17/451,572, filed Oct. 20, 2021, which claims priority to and the benefit of U.S. Provisional Patent Application No. 63/124,482, filed on Dec. 11, 2020, the entire contents of each are incorporated by reference to the present application.

BACKGROUND

Sorting apparatuses may be utilized to automatically perform sorting operations in various environments (e.g., material handling enterprise (MHE), warehouses, and/or the like). Many sorting apparatuses are plagued by technical challenges and limitations. Through applied effort, ingenuity, and innovation, many of these identified problems have been solved by developing solutions that are included in embodiments of the present disclosure, many examples of which are described in detail herein.

BRIEF SUMMARY

Various embodiments described herein relate to methods, apparatuses, and systems for automatically performing sorting operations.

In accordance with various examples of the present disclosure, an apparatus is provided. The apparatus may comprise an array of gripping elements and at least one processing component configured to: obtain image data corresponding with the plurality of items; identify, from the image data, one or more characteristics of the plurality of items; determine, based at least in part on the one or more characteristics, an ordered sequence corresponding with the plurality of items; and generate a control indication to cause at least one of the gripping elements to perform the sorting operations based at least in part on the ordered sequence.

In some examples, the ordered sequence defines a sequence, target parameters and a timing for one or more of singulation operations and depalletizing operations with respect to the plurality of items.

In some examples, the one or more characteristics comprise one or more of a type, a material, an estimated weight, a location and dimensions.

In some examples, the apparatus may comprise at least one image sensing component. The processing component may further be configured to generate a control indication to cause the at least one image sensing component to capture the image data.

In some examples, causing the at least one of the gripping elements to perform one or more sorting operations comprises causing the at least one gripping element to transfer the plurality of items from a first location to a second location, and deposit each of the plurality of items at the second location based at least in part on the ordered sequence.

In some examples, the at least one processing component is configured to determine the ordered sequence based at least in part on a machine learning model.

In some examples, the machine learning model comprises an artificial neural network.

In some examples, the machine learning model comprises an ensemble learning methods such as a Random Forest.

In some examples, the ensemble learning method comprises a Random Forest.

In some examples, the at least one processing component is configured to identify the one or more characteristics pursuant to an image segmentation and/or object pose estimation techniques.

In accordance with various examples of the present disclosure, a method is provided. The method may comprise obtaining, by at least one processing component, image data corresponding with a plurality of items; identifying, from the image data, one or more characteristics of the plurality of items; determining, based at least in part on the one or more characteristics, an ordered sequence corresponding with the plurality of items; and generating a control indication to cause at least one gripping element to perform the sorting operations based at least in part on the ordered sequence.

In accordance with various examples of the present disclosure, a computer program product is provided. The computer program product may comprise at least one non-transitory computer-readable storage medium having computer executable program code instructions therein, the computer executable program code instructions comprising program code instructions configured, upon execution, to obtain image data corresponding with the plurality of items; identify, from the image data, one or more characteristics of the plurality of items; determine, based at least in part on the one or more characteristics, an ordered sequence corresponding with the plurality of items; and generate a control indication to cause at least one gripping elements to perform the sorting operations based at least in part on the ordered sequence.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
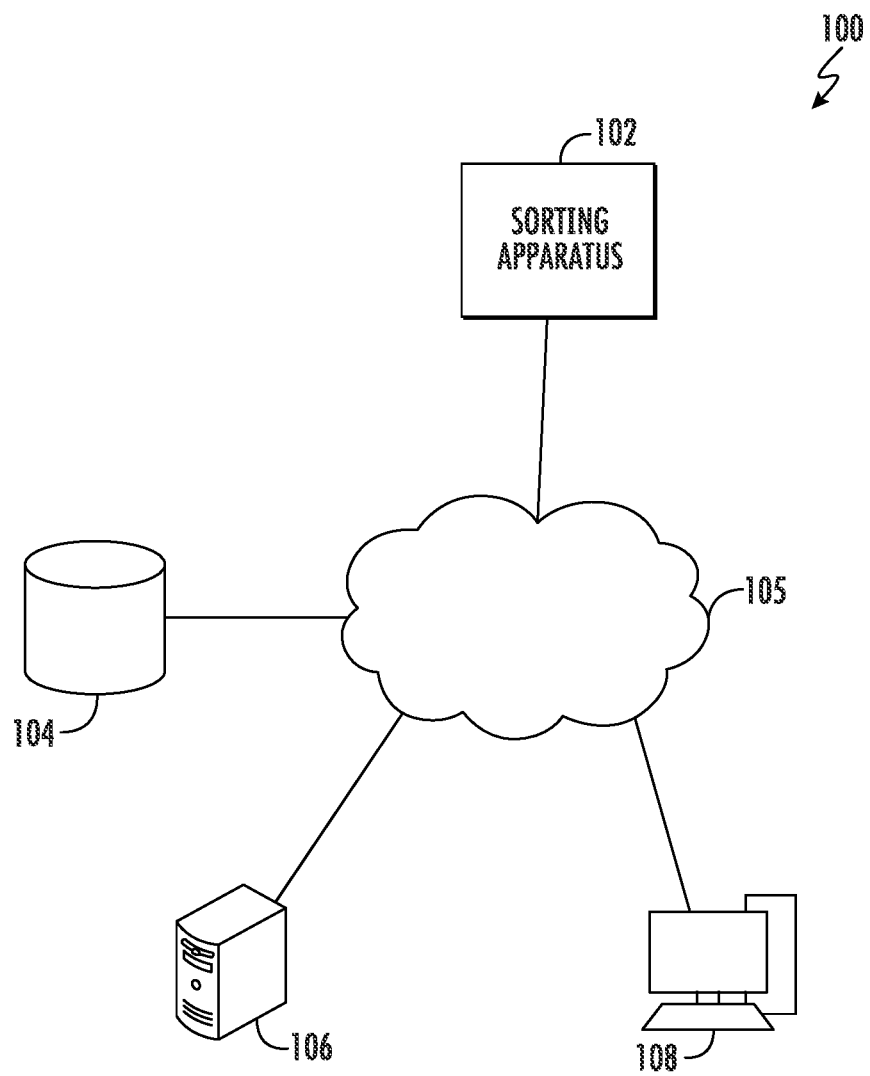
FIG. 1 illustrates an example system in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in dashed line for visibility of the underlying components.

The phrases "in an example embodiment," "some embodiments," "various embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such components or features may be optionally included in some embodiments, or may be excluded.

The term "electronically coupled" or "in electronic communication with" in the present disclosure refer to two or more electrical elements (for example, but not limited to, an example processing circuitry, communication module, input/output module memory, image sensing component, gripping element) and/or electric circuit(s) being connected through wired means (for example but not limited to, conductive wires or traces) and/or wireless means (for example but not limited to, wireless network, electromagnetic field), such that data and/or information (for example, electronic indications, signals) may be transmitted to and/or received from the electrical elements and/or electric circuit(s) that are electronically coupled.

The term "singulation" may refer to sorting operations (e.g., in MHE applications) in which a plurality of items may be separated and spaced such that they can be conveyed in a continuous row along a channel (e.g., a belt), such as a channel associated with an item processing machine or system. Singulation operations may be necessary in a variety of applications including high volume order fulfilment, shipping, manufacturing and the like. By way of example, singulation may be one of a number of operations (e.g., sorting operations) performed at a facility (e.g., warehouse). Sorting operations may be coordinated and/or orchestrated using warehouse management systems. In some embodiments, items may be separated, spaced and arranged in a single stream or file. In some embodiments, items may be arranged in groups of two, three or the like. Singulation may be performed by human operators manually collecting a number of items and depositing them at a location (e.g., one at a time, two at a time or the like). In some examples, singulation machines may perform singulation operations.

The term "depalletizing" may refer to sorting operations in which a pallet comprising a flat transport structure supporting an arrangement of items is disassembled or unloaded. An example pallet may comprise a plurality of identical items comprising identical stock-keeping units, sizes, shapes, products and/or the like. In some examples, the example pallet may comprise a plurality of different types of items having a variety of stock-keeping units, sizes, shapes, products, and/or the like. In some examples, depalletizing comprises sequentially disassembling layers of items. For example, a human operator or a machine (e.g., depalletizing vehicle operated by a user or the like) may perform depalletizing operations.

In various applications, such as MHE applications, items (e.g., parcels, packages, boxes and/or the like) may be conveyed in bulk from one location to another location (e.g., from a pick area to a drop area). In some examples, these items may be conveyed to a particular location at which they may be separated and/or arranged into a stream. By way of example, a plurality of items may be conveyed from a first location to a second location at which they may be individually selected and individually placed on a discharge conveyor or belt in a single stream for further processing. In some examples, sorting operations (e.g., singulation, depalletizing or the like) requiring identification and selection of individual items from groups of items (e.g., bulk chutes) are performed by human operators because it is necessary to select more than one item simultaneously and then deposit (e.g., release) the items sequentially. However, sorting operations performed by human operators may be time consuming and inefficient.

In general, human operators may perform sorting operations at a slow pace leading to inefficiencies in warehouse management operations. Singulation machines may require frequent adjustments and/or operator intervention due to changing requirements in the field. Additionally, singulation machines may be unable to efficiently perform singulation and depalletizing operations when bulk items comprise a variety of item types are present. These challenges may lead to bottlenecks and inefficient operations (e.g., machine idling) in a variety of applications. In some examples, subsequent to depalletizing, items may then require singulation. This may further exacerbate operational inefficiencies when only human operators and/or inadequate machinery are available to perform such operations.

The present disclosure, in some examples, provides an automatic sorting apparatus for efficiently and quickly performing sorting operations/tasks. For example, the sorting apparatus may be configured to identify and simultaneously collect (e.g., pick up) a plurality of items. The sorting apparatus may be configured to transfer the plurality of items from a first location to a second location. Then the automatic apparatus may be configured to selectively and/or sequentially deposit (e.g., drop) the items at the second location. In some examples, the sorting apparatus may be configured determine an ordered sequence and deposit the items sequentially based at least in part on the ordered sequence. As such, the present disclosure provides a sorting apparatus executing fewer operations overall thus increasing operational throughput in a variety of applications.

In some embodiments, the sorting apparatus of the present disclosure, in some examples, comprises at least one gripping element configured to collect an item from a first location and deposit the item at a second location. In some embodiments, the gripping element may be or comprise a gripping and/or vacuum tool that can conform to the shapes of a variety of items (e.g., bulk products) thereby facilitating collecting more than one item simultaneously. The sorting apparatus may be configured to identify items. For example, in various embodiments, the apparatus may be configured to identify items prior to or subsequent to transmitting a control indication to cause the at least one gripping element to collect (e.g., pick up) at least one of the items. In some embodiments, the sorting apparatus may be configured to obtain image data and analyze the image data pursuant to an image segmentation and/or object pose estimation techniques. The sorting apparatus may be configured to transmit a control signal to cause the gripping element to release the plurality items sequentially. In some examples, the apparatus may transmit a control signal to cause the gripping element to release the plurality of items in accordance with a determined ordered sequence. In some examples, the apparatus may transmit a control signal to cause the gripping element to release the plurality of items according to stock-keeping unit, size, shape, product, and/or the like. In yet other examples, the apparatus may transmit a control signal to cause the gripping element to release groups of items according to stock-keeping unit, size, shape, product, and/or the like. The methods of the present disclosure increase speed, throughput and reduce the number operations required to perform sorting operations (e.g., singulation and/or depalletizing).

Referring now to FIG. 1, an example schematic diagram depicts an example system 100 that can be used in conjunction with various embodiments of the present disclosure. As depicted, the system 100 comprises a sorting apparatus 102, one or more computing entities 106 (e.g., servers), one or more databases 104, one or more networks 105, one or more user computing entities 108 and/or the like.

In various embodiments, the sorting apparatus 102 may be or comprise an artificial intelligence computing entity (e.g., robot) configured to perform sorting operations (e.g., singulation and depalletizing). In some examples, the sorting apparatus 102 may comprise at least one processing component, at least one gripping element and at least one image sensing component.

In some embodiments, the sorting apparatus 102 (e.g., one or more processors of the sorting apparatus 102), the one or more computing entities 106, the one ore more databases 104, and/or the one or more user computing entities 108 are in electronic communication with each other over the one or more networks 105 such that they can exchange data (e.g., receive and transmit data) with one another. In some embodiments, at least a portion of the processing component (e.g., one or more processors) of the sorting apparatus 102 may be located remotely from the sorting apparatus 102, while in other embodiments, the processing component of the sorting apparatus 102 may be collocated (e.g., embodied within a unitary body). Each of the components of the system, including the sorting apparatus 102, the one or more computing entities 106, the one or more databases 104, and/or the one or more user computing entities 108 may be in communication with one another over the same or different wireless or wired networks 105 including, for example, a wired or wireless Personal Area Network (PAN), Local Area Network (LAN), Metropolitan Area Network (MAN), Wide Area Network (WAN), cellular network, and/or the like. For example, the sorting apparatus 102 may be in communication with the one or more computing entities 106 and/or user computing entities 108 via the Cloud. While FIG. 1 illustrates certain system components as separate, standalone devices, the various embodiments are not limited to this particular architecture.

While FIG. 1 provides an example system 100, it is noted that the scope of the present disclosure is not limited to the example shown in FIG. 1. In some examples, the system 100 may comprise one or more additional and/or alternative elements, and/or may be different from that illustrated in FIG. 1.

In accordance with various embodiments of the present disclosure, example methods, apparatuses, computer program products and systems are provided.

For example, the present disclosure may provide a sorting apparatus configured to automatically perform sorting operations with respect to a plurality of items. The sorting apparatus may be a component of a processing/sorting machine or system. The apparatus may comprise an array of gripping elements and at least one processing component configured to obtain image data corresponding with the plurality of items. The apparatus may be configured to, identify, from the image data, one or more characteristics of the plurality of items, determine, based at least in part on the one or more characteristics, an ordered sequence corresponding with the plurality of items, and generate a control indication to cause at least one of the gripping elements to perform the sorting operations based at least in part on the ordered sequence. In some examples, the ordered sequence defines a sequence, target parameters and a timing for one or more of singulation operations and depalletizing operations with respect to the plurality of items. In some examples, the one or more characteristics comprise one or more of a type, a material, an estimated weight, a location, dimensions, a stock-keeping unit, and/or like. In some examples, the apparatus may comprise at least one image sensing component. The processing component may further be configured to generate a control indication to cause the at least one image sensing component to capture the image data. In some examples, causing the at least one gripping element to perform one or more sorting operations comprises causing the gripping element to transfer the plurality of items from a first location to a second location, and deposit each of the plurality of items at the second location based at least in part on the ordered sequence. In some examples, the at least one processing component is configured to determine the ordered sequence based at least in part on a machine learning model. By way of example, the processing component may determine the ordered sequence by utilizing an artificial neural network or ensemble learning methods such as a Random Forest. In some examples, the at least one processing component is configured to identify the one or more characteristics pursuant to an image segmentation and/or object pose estimation techniques.

Figure 2:
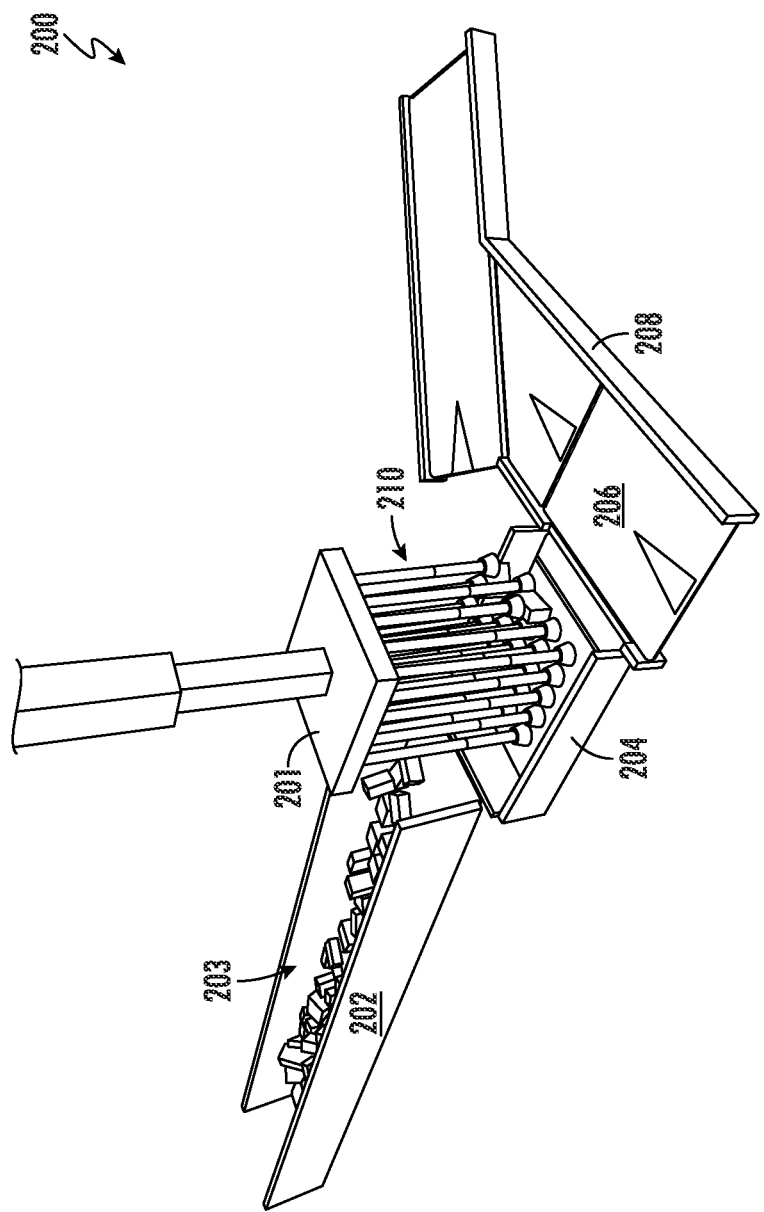
FIG. 2 illustrates an operational example in accordance with various embodiments of the present disclosure.

Referring now to FIG. 2, an operational example depicting a sorting apparatus 201 and a processing system 200 in accordance with various embodiments of the present disclosure is provided. In some examples, the sorting apparatus 201 may be or comprise a component of a processing machine/system. In some examples, the sorting apparatus 201 may be distinct from the processing machine/system. In some embodiments, the processing system 200 may be or comprise a conveyor or belt, and/or any other type of processing machinery. In some embodiments, the processing system 200 may be located in a facility or environment in which sorting operations (e.g., singulation and depalletizing) may be performed (e.g., a warehouse).

As depicted, the processing system 200 comprises a plurality of interconnected channels defining a path along which items may be conveyed from a start point to an end point in a particular direction. As depicted, the processing system 200 is in communication with a sorting apparatus 201. In various examples, the sorting apparatus 201 may be integrated with or distinct from the processing system 200. The sorting apparatus 201 may be configured to collect and convey items from one location (e.g., a first location or area of the processing system 200) to another location (e.g., a second location or area of the processing system 200). As depicted, the processing system 200 is configured to convey items 203 along a first channel 202 to a first location 204. As shown the first location 204 may be a collection area (e.g., pick area) from which items may be collected subsequent to being conveyed along the first channel 202. Then the sorting apparatus 201 is configured to collect (e.g., pick up) the items 203 from the first location 204 and deposit (e.g., drop) the items 203 at a second location 206. The second location 206 may be a discharge or release area (e.g., drop area) at which the items 203 may be deposited (e.g., released) prior to continuing to be conveyed along a second channel 208.

As noted above, the processing system 200 comprises a sorting apparatus 201 configured to collect items 203 from the first location 204 and deposit the items at the second location 206. As such, in the example provided, the sorting apparatus 201 is located adjacent or close to the first location 204 and the second location 206. As shown, the sorting apparatus 201 comprises a body and an array of gripping elements 210. In some examples, the body of the sorting apparatus 201 may be or comprise a connection or integration location between the sorting apparatus 201 and the processing system 200. Each gripping element of the array of gripping elements 210 may be configured to adhere to items 203 in order to transfer the items 203 from a first location 204 to a second location 206.

While FIG. 2 provides an example of a processing system 200 and sorting apparatus 201, it is noted that the scope of the present disclosure is not limited to the examples shown in FIG. 2. For example, in some embodiments, an example sorting apparatus 201 may comprise one or more additional and/or alternative elements, and/or may be structured/positioned differently than illustrated in FIG. 2. For example, in some examples, the sorting apparatus 201 may be embodied as a motorized vehicle.

Figure 3:
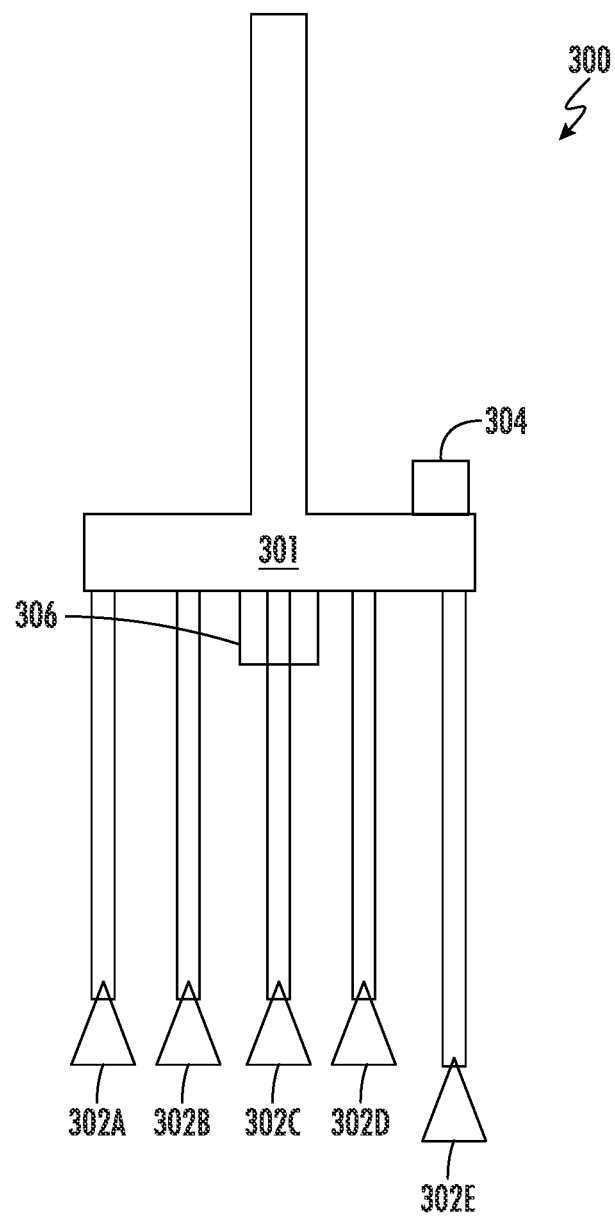
FIG. 3 illustrates an example apparatus in accordance with various embodiments of the present disclosure.

Referring now to FIG. 3, an example sorting apparatus 300 is provided. As depicted, the example sorting apparatus 300 comprises at least a body 301, at least a plurality of gripping elements 302A, 302B, 302C, 302D and 302E, a processing component 304 and an image sensing component 306.

As depicted in FIG. 3, the example sorting apparatus 300 comprises a body 301 defining a structure of the sorting apparatus 300. As noted above, the body 301 may serve as a connection or integration location between the sorting apparatus 300 and a processing system (e.g., comprising a conveyor or belt). In various examples, the sorting apparatus 300 (such as the body 301) may be fixedly or removably coupled/attached to a portion of the processing system. In some examples, the body 301 may be a moveable and/or adjustable mechanical arm configured to move between a plurality of locations. In some examples, the body 301 may define at least a portion of a motorized vehicle.

As depicted in FIG. 3, the example sorting apparatus 300 comprises a body 301 defining a structure of the sorting apparatus 300. As noted above, the body 301 may serve as a connection or integration location between the sorting apparatus 300 and a processing system (e.g., comprising a conveyor or belt). In various examples, the sorting apparatus 300 (such as the body 301) may be fixedly or removably coupled/attached to a portion of the processing system.

As depicted in FIG. 3, the sorting apparatus 300 comprises a plurality of gripping elements 302A, 302B, 302C, 302D and 302E, each of which is configured to adhere to the surface of an item in order to collect (e.g., pick up) the item from one location and deposit the item at another location (e.g., within a processing system). An example gripping element 302A, 302B, 302C, 302D and 302E may be or comprise a mechanical (e.g., spring loaded) and/or electromechanical arm (e.g., comprising a mechanical piston or the like) coupled with an adhering element such as a malleable and/or deformable material (e.g., plastic, polymer or the like). In some examples, the gripping element 302A, 302B, 302C, 302D and 302E may be configured to linearly translate (e.g., extend and contract) such that the sorting apparatus 300 can operate to collect, transfer and deposit an item. In various examples, each of the gripping elements 302A, 302B, 302C, 302D and 302E is fixedly or removably coupled/attached to a surface of the body 301 of the sorting apparatus 300. As depicted, each gripping element 302A, 302B, 302C, 302D and 302E comprises an extendible arm coupled to an adhering element in which a first end is attached to the body 301 of the sorting apparatus 300 and a second end (e.g., the adhering element) is configured to collect items. In some examples, each gripping element 302A, 302B, 302C, 302D and 302E may comprise a vacuum element that is configured to generate suction in order to adhere to an item. An example gripping element 302A, 302B, 302C, 302D and 302E may generate suction in response to receiving a control indication from the processing component 304. The example gripping element may stop generating suction in order to release the item in response to receiving a second control indication. Additionally, each gripping element 302A, 302B, 302C, 302D and 302E may comprise one or more pressure sensors, vacuum sensors, pressure gauges and/or the like to provide feedback to the processing component 304 of the sorting apparatus 300. Each of the gripping elements 302A, 302B, 302C, 302D and 302E may be individually actuated by the processing component 304 of the sorting apparatus 300. In some embodiments, one or more gripping elements 302A, 302B, 302C, 302D and 302E may define a zone. For example, a particular zone defining a subset of gripping elements 302A, 302B, 302C, 302D and 302E may be actuated simultaneously or in sequence by the processing component 304 of the sorting apparatus 300.

As depicted in FIG. 3, the example sorting apparatus 300 comprises at least one an image sensing component 306 configured to obtain image data (e.g., color images, depth images, both color images and black/white images, and/or the like) in relation to items and/or objects that are present within the environment of the sorting apparatus 300. In some examples, the image sensing component 306 may be coupled to a surface of the sorting apparatus 300. For example, as shown, the image sensing component 306 is coupled to a bottom surface of the body 301 of the gripping element. In various embodiments, image sensing component 306 may be or comprise one or more camera(s) such as two dimensional (2D) and/or three dimensional (3D) light detection and ranging (LiDAR) sensor(s), long, medium, and/or short range radio detection and ranging (RADAR) sensor(s), (near-) infrared (IR) cameras, 3D cameras, 360° cameras, and/or other image sensors that enable the sorting apparatus 300 to determine and identify one or more objects within its environment and features associated therewith. Additionally, the example sorting apparatus 300 may comprise other components configured to perform various operations, procedures, functions or the like described herein. By way of example, the sorting apparatus 300 may also comprise one or more location sensors, ultrasonic sensors, electromagnetic sensors accelerometer(s), gyroscope(s) and/or the like. In some embodiments, one or more of the image sensing components 306 and/or other sensors may be located remotely from the sorting apparatus 300. In such examples, one or more image sensing components 306 may be in electronic communication with the sorting apparatus 300 (such as the processing component 304 of the sorting apparatus) such that it can exchange data (e.g., receive and transmit data) with the sorting apparatus 300.

While FIG. 3 provides an example of various elements of a sorting apparatus 300, it is noted that the scope of the present disclosure is not limited to the examples shown in FIG. 3. For example, in some embodiments, an example sorting apparatus 300 may comprise one or more additional and/or alternative elements, and/or may be structured/positioned differently than illustrated in FIG. 3.

Figure 4:
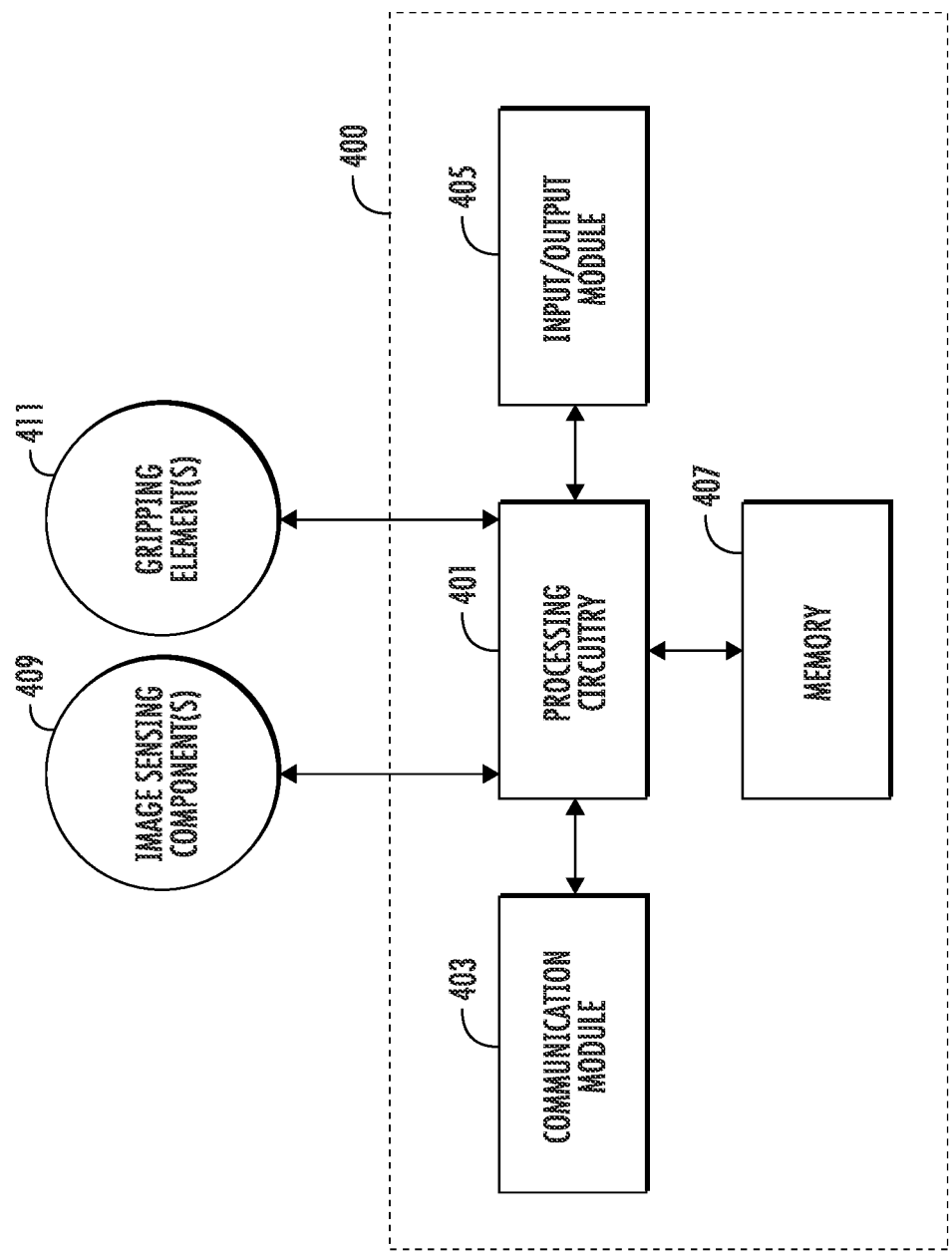
FIG. 4 illustrates an example processor component in electronic communication with various other components of an example apparatus in accordance with various embodiments of the present disclosure.

Referring now to FIG. 4, a schematic diagram depicting an example processing component 400 of an example sorting apparatus in electronic communication with various other components in accordance with various embodiments of the present disclosure is provided. As shown, the processing component 400 comprises processing circuitry 401, a communication module 403, input/output module 405, a memory 407 and/or other components configured to perform various operations, procedures, functions or the like described herein.

In one example, the processing component 400 may include an application processor, an image processor, or any other necessary components required for functioning of the sorting apparatus 300. While FIG. 4 depicts a single processing component 400, additional processors/processing components may be included. The processing component 400 may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some embodiments, the processing component 400 may include any suitable type of single or multi-core processor, microcontroller, central processing unit, and/or the like. Any of the processing components disclosed herein may be configured to perform certain functions. Configuring a processing component 400, such as any of the described processors, controllers or microprocessors, to perform certain functions may include programming of computer executable instructions and making those instructions available to the processing component for execution during operation of the processing component. In some embodiments, configuring a processing component 400 may include programming the processing component/device directly with architectural instructions. In other embodiments, configuring a processing component 400 may include storing executable instructions on a memory that is accessible to the processing component during operation. For example, the processing component 400 may access the memory to obtain and execute the stored instructions during operation.

As shown, the processing component 400 (such as the processing circuitry 401, communication module 403, input/output module 405 and memory 407) is electrically coupled to and/or in electronic communication with at least one an image sensing component 409 and at least one gripping element 411. As depicted, each of the image sensing component 409 and the gripping element 411 and the processing component 400 of the sorting apparatus may exchange (e.g., transmit and receive) data with the processing circuitry 401 of the processing component 400.

In some embodiments, the processing circuitry 401 may be implemented as, for example, various devices comprising one or a plurality of microprocessors with accompanying digital signal processors; one or a plurality of processors without accompanying digital signal processors; one or a plurality of coprocessors; one or a plurality of multi-core processors; one or a plurality of controllers; processing circuits; one or a plurality of computers; and various other processing elements (including integrated circuits, such as ASICs or FPGAs, or a certain combination thereof). In some embodiments, the processing circuitry 401 may comprise one or more processors. In one exemplary embodiment, the processing circuitry 401 is configured to execute instructions stored in the memory 407 or otherwise accessible by the processing circuitry 401. When executed by the processing circuitry 401, these instructions may enable the processing component 400 to execute one or a plurality of the functions as described herein. No matter whether it is configured by hardware, firmware/software methods, or a combination thereof, the processing circuitry 401 may comprise entities capable of executing operations according to the embodiments of the present disclosure when correspondingly configured. Therefore, for example, when the processing circuitry 401 is implemented as an ASIC, an FPGA, or the like, the processing circuitry 401 may comprise specially configured hardware for implementing one or a plurality of operations described herein. Alternatively, as another example, when the processing circuitry 401 is implemented as an actuator of instructions (such as those that may be stored in the memory 407), the instructions may specifically configure the processing circuitry 401 to execute one or a plurality of algorithms and operations described herein, such as those discussed with reference to FIG. 5.

The memory 407 may comprise, for example, a volatile memory, a non-volatile memory, or a certain combination thereof. Although illustrated as a single memory in FIG. 4, the memory 407 may comprise a plurality of memory components. In various embodiments, the memory 407 may comprise, for example, a hard disk drive, a random access memory, a cache memory, a flash memory, a Compact Disc Read-Only Memory (CD-ROM), a Digital Versatile Disk Read-Only Memory (DVD-ROM), an optical disk, a circuit configured to store information, or a certain combination thereof. The memory 407 may be configured to store information, data, application programs, instructions, and etc., so that the processing component 400 can execute various functions according to the embodiments of the present disclosure. For example, in at least some embodiments, the memory 407 is configured to cache input data for processing by the processing circuitry 401. Additionally or alternatively, in at least some embodiments, the memory 407 is configured to store program instructions for execution by the processing circuitry 401. The memory 407 may store information in the form of static and/or dynamic information. When the functions are executed, the stored information may be stored and/or used by the processing component 400.

The communication module 403 may be implemented as any apparatus included in a circuit, hardware, a computer program product or a combination thereof, which is configured to receive and/or transmit data from/to another component or apparatus. The computer program product comprises computer-readable program instructions stored on a computer-readable medium (for example, the memory 407) and executed by a processing component 400 (for example, the processing circuitry 401). In some embodiments, the communication module 403 (as with other components discussed herein) may be at least partially implemented as the processing circuitry 401 or otherwise controlled by the processing circuitry 401. In this regard, the communication module 403 may communicate with the processing circuitry 401, for example, through a bus. The communication module 403 may comprise, for example, antennas, transmitters, receivers, transceivers, network interface cards and/or supporting hardware and/or firmware/software, and is used for establishing communication with another apparatus. The communication module 403 may be configured to receive and/or transmit any data that may be stored by the memory 407 by using any protocol that can be used for communication between apparatuses. The communication module 403 may additionally or alternatively communicate with the memory 407, the input/output module 405 and/or any other component of the processing component 400, for example, through a bus.

In some embodiments, the processing component 400 may comprise an input/output module 405. The input/output module 405 may communicate with the processing circuitry 401 to receive instructions input by the user and/or to provide audible, visual, mechanical or other outputs to the user. Therefore, the input/output module 405 may comprise supporting devices, such as a keyboard, a mouse, a display, a touch screen display, and/or other input/output mechanisms. Alternatively, at least some aspects of the input/output module 405 may be implemented on a device used by the user to communicate with the processing component 400. The input/output module 405 may communicate with the memory 407, the communication module 403 and/or any other component, for example, through a bus. One or a plurality of input/output modules and/or other components may be included in the processing component 400.

For example, the image sensing component 409 may be similar to image sensing component 306 described above with regard to FIG. 3. For example, image sensing component 409 may obtain image data (e.g., color images and/or depth images) in relation to items and/or objects that are present within the environment and transmit the image data to the processing circuitry 401.

In some embodiments, gripping element 411 may be similar to gripping elements 302A, 302B, 302C, 302D and 302E described above with regard to FIG. 3. For example, gripping element 411 may receive a first control indication from the processing circuitry 401 triggering activation (e.g., actuation) of the gripping element 411. In some examples, triggering activation may comprise causing gripping element 411 to generate suction in order to convey one or more items from a first location to a second location. For example, from a pick area to a drop area or from a pallet to a drop area. For example, gripping element 411 may receive a second control indication from the processing circuitry 401 triggering deactivation of the gripping element 411.

Figure 5:
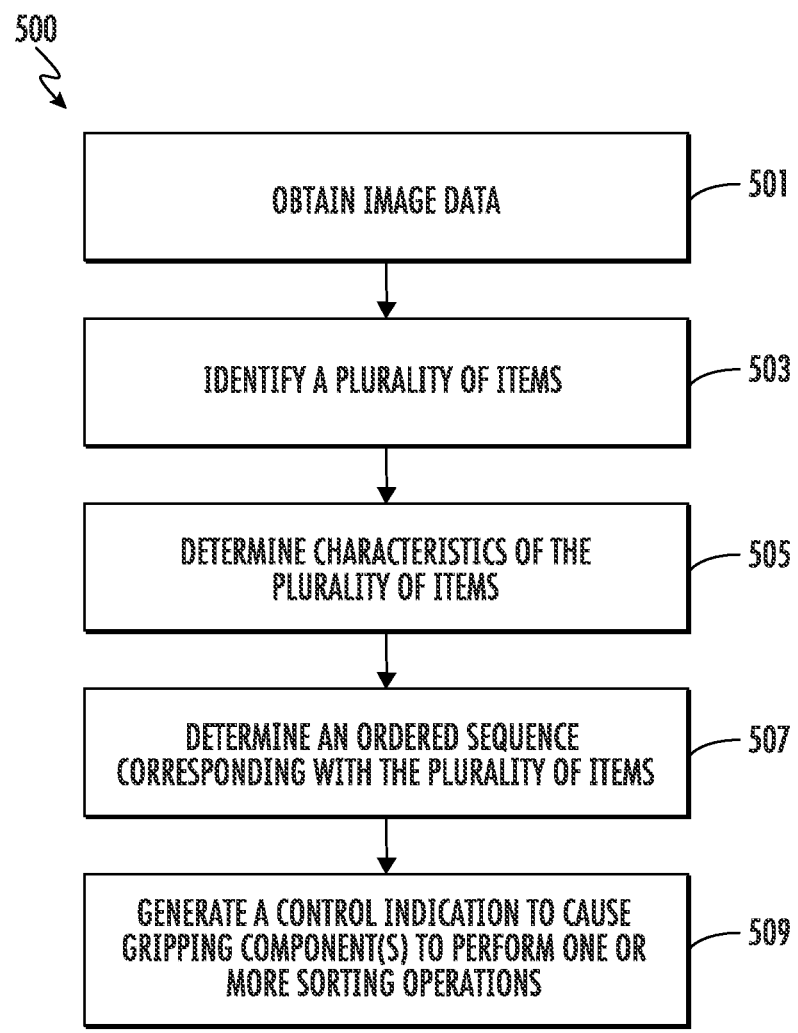
FIG. 5 is a flowchart diagram illustrating example operations in accordance with various embodiments of the present disclosure.

Referring now to FIG. 5, a flowchart diagram illustrating example operations 500 in accordance with various embodiments of the present disclosure is provided.

In some examples, the method 500 may be performed by processing circuitry (for example, but not limited to, processing circuitry 401 of the processing component 400 of sorting apparatus described above with regard to FIG. 4). In some examples, the processing circuitry may be electrically coupled to and/or in electronic communication with other circuitries of the example sorting apparatus, such as, but not limited to, an image sensing component, gripping element, a memory (such as, for example, random access memory (RAM) for storing computer program instructions), and/or the like.

In some examples, one or more of the procedures described in FIG. 5 may be embodied by computer program instructions, which may be stored by a memory (such as a non-transitory memory) of a system employing an embodiment of the present disclosure and executed by a processing component of the system. These computer program instructions may direct the system to function in a particular manner, such that the instructions stored in the memory circuitry produce an article of manufacture, the execution of which implements the function specified in the flow diagram step/operation(s). Further, the system may comprise one or more other circuitries. Various circuitries of the system may be electronically coupled between and/or among each other to transmit and/or receive energy, data and/or information.

In some examples, embodiments may take the form of a computer program product on a non-transitory computer-readable storage medium storing computer-readable program instruction (e.g., computer software). Any suitable computer-readable storage medium may be utilized, including non-transitory hard disks, CD-ROMs, flash memory, optical storage devices, or magnetic storage devices.

The example method 500 begins at step/operation 501. At step/operation 501, a processing component (such as, but not limited to, the processing component 400 of the sorting apparatus illustrated with regard to FIG. 4, discussed above) obtains image data. In some embodiments, an image sensing component (such as, but not limited to, the image sensing component 409 illustrated in connection with FIG. 4) may capture and transmit image data (e.g., color images, depth images and/or the like) to the processing component. The image sensing component may be configured to capture images of a particular area and/or in response to a request. In some embodiments, the image data may comprise additional data/information such as metadata, timestamp data, location data and/or the like. In some embodiments, the processing component may store and process at least a portion of the image data. In some examples, the processing component may transmit at least a portion of the image data to another entity for storage and/or to perform certain operations.

Subsequent to step/operation 501, the example method 500 proceeds to step/operation 503. At step/operation 503, the processing component identifies a plurality of items within a first location. For example, the processing component may be configured to process the received image data, such as by computer-executable instructions, that indicate which data is to be used in the analysis, provide one or more algorithms or functions for performing the analysis, provide one or more coefficients and/or parameters to be used in accordance with an algorithm for performing the analysis, perform one or more guidelines for providing a response indicating a result in the analysis, and/or the like. In example embodiments, the computer executable instructions may be configured in accordance with a standardized computer programming language. In an example embodiment, the computer-executable instructions may comprise a reference to a function repository and/or one or more coefficients and/or parameters to be used in the calculation and or determination of the result of the referenced instructions, function or algorithm. In some embodiments, at least a portion of the analysis may be performed by another computing entity (such as, for example, without limitation, the one or more computing entities 106 described above with regard to FIG. 1). In such examples, the computing entity may perform at least a portion of the analysis and provide (e.g., transmit or send) the results of the analysis to the processing component of the sorting apparatus. In some examples, the processing component and/or computing entity may analyze the image data pursuant to an image segmentation and/or object pose estimation techniques. For example, a computer vision algorithm(s) (e.g., convolutional neural network (CNN), computer vision segmentation algorithms such as region-based segmentation, edge detection or clustering techniques) may be utilized by the processing component and/or other computing entity to identify the plurality of items captured in the image data. In some examples, identifying the plurality of items may comprise identifying a respective label, stock-keeping unit, barcode, packaging and/or the like corresponding with a respective item. The processing component and/or other computing entity may segment objects/items in the image data in order to identify distinct elements/items and characteristics associated therewith. The machine learning model may be trained using a training set of manually analyzed images.

Subsequent to step/operation 503, the method 500 proceeds to step/operation 505. At step/operation 505, the processing component identifies characteristics/attributes of the plurality of items. For example, in some examples, the processing component may identify a set of attributes associated with each item. By way of example, the processing component may identify an item type, an item material, an estimated weight, a respective location, a pose/rotation of the item in space, item dimensions (e.g., height, width and length), stock-keeping unit, and/or the like. By way of example, the processing component may identify package types and/or package characteristics of a plurality of packages at a location (e.g., a plurality of mail packages located in a pick area). In another example, the processing component may identify dimensions (e.g., a height, width, and length) of a plurality of single stock-keeping unit or multiple stock-keeping unit items associated with a layer of a pallet.

Subsequent to step/operation 505, the method proceeds to step/operation 507. At step/operation 507, the processing component determines an ordered sequence corresponding with the plurality of items. The example ordered sequence may define singulation operations and/or depalletizing operations. In some examples, the ordered sequence may define an order, target parameters and/or a timing for picking up each respective item and/or an order, target parameters and/or timing for releasing (e.g., dropping) each respective item. Target parameters may also comprise spacing, an arrangement/configuration, and/or the like. In various embodiments, the ordered sequence may be determined based at least in part on the identified characteristics/attributes of each item. In some examples, determining the ordered sequence comprises associating each item with a respective gripping element and/or zone. Additionally/alternatively, in some embodiments, determining the ordered sequence comprises determining target parameters for actuating one or more gripping elements (e.g., a target location with respect to an item, an amount of suction and/or the like).

By way of example, the processing component may determine that three items, i.e., item A, item B and item C, are located in a first location (e.g., a pick area). Then the processing component may determine that item A and item B have similar characteristics/dimensions and item C is bulkier and/or heavier that items A and item B, such as via one or more images and one or more machine learning algorithms. The example ordered sequence may comprise instructions to pick up item A, item B and item C simultaneously. Additionally, the example ordered sequence may comprise instructions to pick up item A, item B and item C using a respective gripping element that may be located adjacent the respective item. The example ordered sequence may comprise instructions to deposit or drop item A, item B and item C at a second location (e.g., a drop area or conveyer belt). For example, the ordered sequence may comprise instructions to drop item C, pause for a first time duration, proceed to drop item A, pause for second time duration and then proceed to drop item B. In the above example, the first time duration may be longer than the second time duration because item C is bulkier than items A and B and therefore a longer time duration may be required to provide adequate spacing between items C and item A.

By way of further example, the processing component may determine that five items, i.e., item A, item B, item C, item D, and item E, are located in a first location (e.g., a pick area). Then the processing component may determine that item A and item B have similar characteristics/dimensions and items C and E are bulkier and/or heavier that items A and item B, such as via one or more images and one or more machine learning algorithms. The processing component may further determine that item A, item B, and item D are the same item (e.g., based on a detection of a stock-keeping unit). The example ordered sequence may comprise instructions to pick up item A, item B, and item D simultaneously and then drop item A, item B, and item D simultaneously at a second location (e.g., a drop area or conveyer belt). Alternatively or additionally, the example ordered sequence may comprise instructions to pick up item all items and then may comprise instructions to deposit or drop item A, item B, and item D, pause for a first time duration, proceed to drop item C, pause for second time duration and then proceed to drop item E.

Subsequent to step/operation 507, the method proceeds to step/operation 509. At step/operation 509, the processing component generates a control indication to cause one or more gripping elements (such as, but not limited to, the gripping element(s) 411 illustrated in connection with FIG. 4, discussed above) to perform one or more operations (e.g., sorting tasks) with respect to the plurality of items based at least in part on the determined ordered sequence. In some embodiments, generating a control indication may comprise transmitting a control indication to one or more gripping elements to cause actuation of the respective gripping element based at least in part on determined parameters. Causing actuation of a gripping element may comprise causing a switch or relay connected to the gripping element to be turned on in response to receiving the control indication.

Using the methods and systems described above, automated operations sorting (e.g., singulation and/or depalletizing) can be performed quickly and accurately in a variety of applications.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus for automatically performing sorting operations with respect to a plurality of items, the apparatus comprising:
one or more gripping elements; and
at least one processing component configured to:
obtain image data corresponding with the plurality of items;
identify, from the image data, one or more characteristics of the plurality of items;
determine, based at least in part on the one or more characteristics, an ordered sequence corresponding with the plurality of items; and
generate a control indication to cause the one or more gripping elements to perform the sorting operations based at least in part on the ordered sequence, wherein the ordered sequence comprises a set of instructions to pause a deposit of at least one item of the plurality of items for at least a predetermined time duration based on the one or more characteristics of the plurality of items.

2. The apparatus of claim 1, wherein the ordered sequence defines a sequence, target parameters and a timing for one or more of singulation operations and depalletizing operations with respect to the plurality of items.

3. The apparatus of claim 1, wherein the one or more characteristics comprise one or more of a type, a material, an estimated weight, a location and dimensions.

4. The apparatus of claim 1, wherein the apparatus further comprises at least one image sensing component, wherein the at least one processing component is further configured to:
generate the control indication to cause the at least one image sensing component to capture the image data.

5. The apparatus of claim 1, wherein the at least one processing component is configured to:
cause the one or more gripping elements to collect and sequentially deposit at least two or more items of the plurality of items, comprising causing the one or more gripping elements to:
transfer the plurality of items from a first location to a second location; and
deposit each of the plurality of items at the second location based at least in part on the ordered sequence.

6. The apparatus of claim 1, wherein the at least one processing component is configured to determine the ordered sequence based at least in part on a machine learning model.

7. The apparatus of claim 1, wherein the at least one processing component is configured to identify the one or more characteristics pursuant to an image segmentation and/or object pose estimation techniques.

8. A method for automatically performing sorting operations with respect to a plurality of items, the method comprising:
obtaining, by at least one processing component, image data corresponding with the plurality of items;
identifying, from the image data, one or more characteristics of the plurality of items;
determining, based at least in part on the one or more characteristics, an ordered sequence corresponding with the plurality of items; and
generating a control indication to cause one or more gripping elements to perform the sorting operations based at least in part on the ordered sequence, wherein the ordered sequence comprises a set of instructions to pause a deposit of at least one item of the plurality of items for at least a predetermined time duration based on the one or more characteristics of the plurality of items.

9. The method of claim 8, wherein the ordered sequence defines a sequence, target parameters and a timing for one or more of singulation operations and depalletizing operations with respect to the plurality of items.

10. The method of claim 8, wherein the one or more characteristics comprise one or more of a type, a material, an estimated weight, a location and dimensions.

11. The method of claim 8, further comprising:
generating a second control indication to cause at least one image sensing component to capture the image data.

12. The method of claim 8, further comprising:
generating the control indication to cause the one or more gripping elements to collect and sequentially deposit the plurality of items, comprising causing the one or more gripping elements to:
transfer the plurality of items from a first location to a second location; and
deposit each of the plurality of items at the second location based at least in part on the ordered sequence.

13. The method of claim 8, further comprising determining the ordered sequence based at least in part on a machine learning model.

14. The method of claim 8, further comprising identifying the one or more characteristics pursuant to an image segmentation and/or object pose estimation techniques.

15. A computer program product configured to automatically perform sorting operations with respect to a plurality of items, the computer program product comprising at least one non-transitory computer-readable storage medium having computer executable program code instructions therein, the computer executable program code instructions comprising program code instructions configured, upon execution, to:
obtain image data corresponding with the plurality of items;
identify, from the image data, one or more characteristics of the plurality of items;
determine, based at least in part on the one or more characteristics, an ordered sequence corresponding with the plurality of items; and
generate a control indication to cause one or more gripping elements to perform the sorting operations based at least in part on the ordered sequence, wherein the ordered sequence comprises a set of instructions to pause a deposit of at least one item of the plurality of items for at least a predetermined time duration based on the one or more characteristics of the plurality of items.

16. The computer program product of claim 15, wherein the ordered sequence defines a sequence, target parameters and a timing for one or more of singulation operations and depalletizing operations with respect to the plurality of items.

17. The computer program product of claim 15, wherein the one or more characteristics comprise one or more of a type, a material, an estimated weight, a location and dimensions.

18. The computer program product of claim 15, wherein the computer executable program code instructions further comprise the program code instructions configured to, upon execution, to:
    generate a second control indication to cause at least one image sensing component to capture the image data.

19. The computer program product of claim 15, wherein generating the control indication to cause the one or more gripping elements to collect and sequentially deposit at least two or more items of the plurality of items comprises causing the one or more gripping elements to:
    transfer the plurality of items from a first location to a second location; and
    deposit each of the plurality of items at the second location based at least in part on the ordered sequence.

20. The computer program product of claim 15, wherein the ordered sequence is determined based at least in part on a machine learning model.

\* \* \* \* \*